No. 787,632. PATENTED APR. 18, 1905.
I. E. PALMER.
STRETCHER OR SPREADER.
APPLICATION FILED SEPT. 15, 1904.
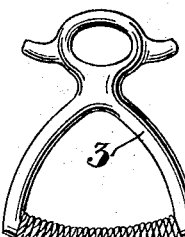
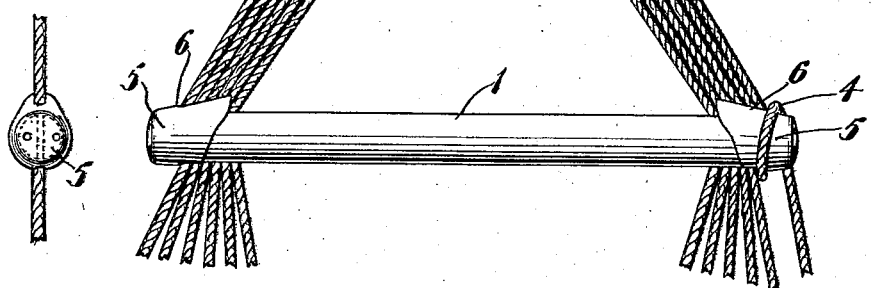
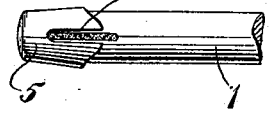
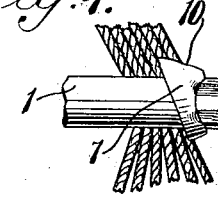
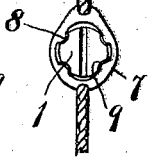
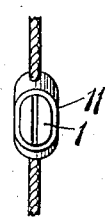
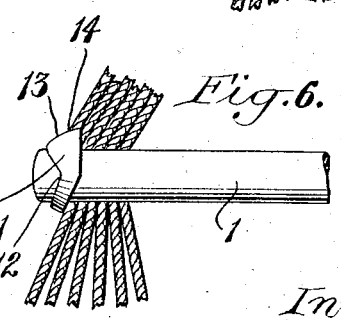
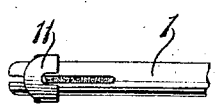
Witnesses:
F. George Barry,
F. George Hachenberg.
Inventor:
Isaac E. Palmer
By Brown & Seward
his Attorneys No. 787,632. Patented April 18, 1905.

UNITED STATES PATENT OFFICE.

ISAAC E. PALMER, OF MIDDLETOWN, CONNECTICUT.

STRETCHER OR SPREADER.

SPECIFICATION forming part of Letters Patent No. 787,632, dated April 18, 1905.

Application filed September 15, 1904. Serial No. 224,611.

*To all whom it may concern:*

Be it known that I, ISAAC E. PALMER, a citizen of the United States, and a resident of Middletown, in the county of Middlesex and State of Connecticut, have invented a new and useful Stretcher or Spreader, of which the following is a specification.

My invention relates to a stretcher or spreader, with the object in view of providing means for automatically relieving a suspension-cord when for any cause it becomes caught around the end of the stretcher or spreader, as is common in the use of hammocks.

A practical embodiment of my invention is represented in the accompanying drawings, in which—

Figure 1 is a view of the hammock-supporting devices such as are commonly employed at the end of a hammock, showing a stretcher or spreader in position as in use with one of the suspension-cords out of its normal position and making a turn over the stretcher or spreader. Fig. 2 is an end view of the stretcher or spreader and the cords in immediate proximity thereto. Fig. 3 is a top plan view of one of the ends of the spreader, showing the suspension-cords at that end in section. Fig. 4 is a view in front elevation of one end of a stretcher or spreader provided with a modified form of cord-relieving device. Fig. 5 is an end view of the same. Fig. 6 is a view in elevation of the end of a stretcher or spreader and the suspension-cords in immediate proximity thereto, showing another modified form of cord-relieving device. Fig. 7 is an end view of the same, and Fig. 8 is a top plan view of the same.

The body of the stretcher or spreader is denoted by 1. The cords, which are held in separated groups by the stretcher or spreader, are denoted by 2 and lead from the opposite ends of the stretcher or spreader to a suspension-hook 3, as is common.

One of the common annoyances in connection with the use of hammocks is the catching of one or more of the suspension-cords over the end of the stretcher or spreader, as shown at 4, Fig. 1, and the occupant failing to notice the cord thus held out of its natural position occupies the hammock, producing undue strain and often breaking the cord so held out of normal position.

My present invention is directed to providing the body 1 of the stretcher or spreader with devices which will automatically relieve the cord from its abnormal position when from any cause it is caught, as shown in Fig. 1, and these devices consist, broadly, in supplying the body 1 of the stretcher or spreader with inclined bearings at its opposite ends, which bearings taper from a point above the body of the stretcher outwardly and downwardly toward the extreme end of the stretcher, so that a suspension-cord when caught around the end of the stretcher will when strain is placed thereon automatically slide down the inclined bearing over the end of the stretcher or spreader, and thus prevent undue strain and breakage. My invention further consists in passing this inclined bearing on the end of the stretcher or spreader inwardly past one or more of the suspension-cords, so that the outer suspension-cord above the inclined bearing may serve as a guard to prevent the cord which is unintentionally caught over the end of the stretcher or spreader from drawing down between the outer suspension-cord and the inner end of the inclined bearing. This inclined bearing may assume different forms. For instance, as shown in Figs. 1, 2, and 3, it consists of a cap-socket ferrule 5, having its upper surface 6 inclined and a slot 7* formed in its upper wall for the reception of several suspension-cords, in the present instance four, thus bringing the outermost of the suspension-cords well toward the outer end of the ferrule 5, while the inner end of the inclined surface 6 of the ferrule is so far removed from the outermost suspension-cord that the cord 4 will be prevented by the outermost suspension-cord from seating itself between said outer cord and the inner end of the inclined surface 6, and so will be kept on the inclined surface 6, where when strain is exerted upon it it will slip over the end of the ferrule 5 and be relieved of strain.

In the form shown in Figs. 4 and 5 the cord-relieving bearing consists of a ring-ferrule 7 with reëntrant tongues or lips 8 for engaging grooves 9 on the end portion of the body of the stretcher or spreader to hold the ferrule in position, the said ring-ferrule 7 being provided with an inclined bearing 10 on its top and with a slot for the reception of one or more of the suspension-cords 2.

In the form shown in Figs. 6, 7, and 8 the cord-relieving bearing is shown as a ring-ferrule 11, having its outer end 12 so shaped as to have a tendency to bind on the body of the stretcher or spreader to prevent it from slipping off, the ring-ferrule 11 being provided with an inclined bearing-surface 13 at its top and with a slot 14, in the present instance not so deep as that shown in Figs. 1 and 2, but capable of receiving within it one, at least, of the suspension-cords to guard against the possible catching of the displaced suspension-cord between it and the outermost suspension-cord.

The device is simple and effective and plays an important part in prolonging the life of the hammock by preventing the overstraining and breaking of the suspension-cords.

What I claim is—

1. The combination with hammock-suspension cords, of a stretcher or spreader engaged with the cords, the said spreader being provided with an inclined bearing at its end exterior to the outermost cord engaged therewith, the said inclined bearing having a slant toward the axis of the spreader as it extends from the outermost cord toward the end of the spreader and located on that side of the spreader opposite that which the hammock occupies for preventing the catching of a cord on the end of the spreader.

2. The combination with hammock-suspension cords, of a hammock-spreader provided with a ferrule at its end exterior to the suspension-cords, the said ferrule being provided with an inclined cord-bearing surface in proximity to the group of suspension-cords.

3. The combination with hammock-suspension cords, of a hammock stretcher or spreader provided with a ferrule on its end exterior to the group of suspension-cords, the said ferrule being provided with an inclined cord-bearing surface in proximity to the suspension-cords and with a slot for the reception of one or more of the outermost of said cords.

4. The combination with hammock-suspension cords, of a stretcher or spreader having a cap-socket ferrule on its end, the said cap-socket ferrule being provided on its top with an inclined cord-bearing surface and with a slot for the reception of the outermost of the hammock-suspension cords.

5. The combination with a hammock stretcher or spreader having a ferrule on its end, of hammock-suspension cords engaged with the spreader and leading from the upper or outer side of the spreader at a point intermediate of the inner and outer ends of the ferrule.

In testimony that I claim the foregoing as my invention I have signed my name, in presence of two witnesses, this 10th day of September, A. D. 1904.

ISAAC E. PALMER.

Witnesses:
   THEODORE PENTLARGE,
   A. D. WOODRUFF.